United States Patent [19]

Fischer

[11] 4,199,129
[45] Apr. 22, 1980

[54] ARRANGEMENT FOR THE MANUFACTURE OF SYNTHETIC PLASTIC MATERIAL HOLLOW BODIES

[76] Inventor: Rainer Fischer, Postrasse 39, 3530 Warburg 2, Fed. Rep. of Germany

[21] Appl. No.: 902,555

[22] Filed: May 3, 1978

[30] Foreign Application Priority Data

May 6, 1977 [DE] Fed. Rep. of Germany ....... 2720448

[51] Int. Cl.² .................... B29C 1/14; B29C 17/07
[52] U.S. Cl. ........................................ 249/58; 249/82; 249/157; 249/158; 249/162; 264/529; 264/534; 425/522; 425/525; 425/527; 425/530
[58] Field of Search ............... 425/522, 525, 527, 530, 425/531, 532, 541; 264/529, 531, 534; 249/58, 82, 157, 158, 161, 162

[56] References Cited

U.S. PATENT DOCUMENTS

| 3,339,232 | 9/1967 | Battenfeld et al. ............... 425/525 X |
| 3,736,201 | 5/1973 | Teraoka .............................. 264/531 X |

FOREIGN PATENT DOCUMENTS

1942933 3/1971 Fed. Rep. of Germany ........... 425/525

*Primary Examiner*—Jan H. Silbaugh
*Attorney, Agent, or Firm*—Michael J. Striker

[57] ABSTRACT

A blow mold for producing bottles or similar hollow containers from parisons of synthetic plastic material comprises two mirror-symmetrically arranged blow mold halves movable toward and away from each other between a closed and an open position. Each of the mold halves includes an outer mold part and an inner mold part guided for independent movement relative to the outer mold part in an endless inner face of the latter, the inner mold part having a concave end face which forms together with an adjacent portion of said inner face of the corresponding outer mold part in the closed position of the mold half of the mold cavity for forming a bottle. Each of the concave end faces of the inner mold part may also be provided with an island-shaped sharp edged projection aligned with and engaging in the closed position of the mold a corresponding projection on the inner mold part of the other mold half for forming a grip opening in the bottle.

4 Claims, 10 Drawing Figures

ARRANGEMENT FOR THE MANUFACTURE OF SYNTHETIC PLASTIC MATERIAL HOLLOW BODIES

The invention relates to an arrangement for the manufacture of synthetic plastic material hollow bodies from a preformed body, with a blowing arbor for the final blowing of the hollow body in a blowing mold consisting of two blowing mold halves of the same kind and movable toward one another and away from each other, wherein each blowing mold half consists of two coaxially but mutually independently movable mold parts.

An arrangement of this kind is known from the DT-OS 23 07 727. It serves for blowing hose-like preformed bodies. Of the at least two mold parts, of which each blowing mold half consists, at least the lower, that is that one which squeezes off the free, originally open, hose end, is movable parallel to the hose or pre-formed body axis. By means of this mold part and of the corresponding mold part of the other blowing mold half, the pre-formed body is stretched, after the blowing mold halves have moved together but before the blowing, in the longitudinal direction, as a result of which there is obtained an increase in the strength of the finished hollow body.

A blowing mold for a hollow body manufactured in accordance with the hose extrusion operation is already known from the DT-AS 12 45 579, which consists of two blowing mold halves of which one includes a piston-like mold part movable normal to the mold-separating plane by a small distance for the formation of a thickened filling nozzle on the blown hollow body.

Furthermore, there is known from the DT-AS 11 43 993 a blowing mold subdivided into two blowing mold halves, on the upper side of which then abut two neck jaws for holding and forming the neck region of the hollow body, which are movable normal to the mold separating plane independently of the blowing mold halves.

Furthermore, there is known from the DT-OS 14 79 695 an arrangement for the manufacture of a double-walled hollow body which is open on one side, which includes two outer molds in one of which there is guided a plunger which establishes the inner mold of the double-walled body.

Finally, it is also known (U.S. Pat. Nos. 3,579,620, 3,159,697 and 3,120,679) to arrange an insular projection in the blowing mold halves of an arrangement for the manufacture of bottles equipped with handles, for the production of the through-passage in the hollow body.

The invention is based on the task to provide an arrangement of the introductorily indicated type which renders it possible to blow hollow bodies with a flat cross section from pre-formed or intermediately formed bodies preferably having circular cross sections, and especially also to blow so-called handgripped bottles.

This task is achieved in accordance with the invention in that the mold parts of each blowing mold half are movable normal to the mold separating plane, in that the first mold part, as an internal profile, has the outer contour of the hollow body along its larger transverse dimension and the second mold part, as an internal profile, has the outer contour of the hollow body along its smaller transverse dimension. No separate protection is claimed for the feature that the mold parts of each mold half are movable normal to the mold separating plane.

The special separation of each blowing mold half renders it possible to first inflate the body being formed, which is introduced into the blowing mold, to a cylindrical shape, while the body does not come into contact with any part of the cooled blowing mold. The first or outer mold parts which initially move toward each other and which are to be closed consequently, then prevent the possibility that the body being formed, which is further held under the influence of an internal pressure via the blowing arbor, is squeezed between the mold halves while the second or inner mold parts are being moved toward each other (close) and thus bring the body being formed to its final cross-sectional shape. In this manner, there is obtained, from a pre-formed or intermediately formed body having a circular cross section, a hollow body having the desired, in most instances, uniform, wall thickness distribution, which is expelled after cooling in the blowing mold. The body to be formed can herein be manufactured in accordance with the extrusion blowing method as well as with the injection molding blowing method. When the arrangement according to the invention is used for the blowing of hose-extruded pre-formed bodies, there results particularly the advantage of a material saving inasmuch as, for all intents and purposes, only that hose section which is located underneath the bottom of the hollow body, as well as possibly the hose region located in the through passage for gripping, need be squeezed off. Since, accordingly, less material than heretofore is needed for the manufacture of a hollow body, there results as a further advantage the use of a smaller extruder as well as a reduction of the power demand for driving, heating and cooling.

Above all, however, the arrangement according to the invention renders it possible for the first time to manufacture synthetic plastic material hollow bodies having another than at least approximately rotationally symmetrical cross section in accordance with the injection molding blowing method.

Namely, despite all of the inherent advantages of the injection molded blown hollow bodies (high shape-retention, uniform wall thicknesses, improved strength, high surface quality, no waste material), only rotationally symmetrical or at least approximately rotationally symmetrical synthetic plastic material hollow bodies have been heretofore manufactured in mass production in accordance with this method, even though a considerable demand has existed in the packaging industry for hollow bodies with flatly rectangular or flatly oval cross sections, especially for flat bottles or so-called handgripped bottles. The reason for this is to be found in the fact that a hollow body with, for instance, a flatly rectangular or oval cross section, was possible to blow from a pre-formed body of a cylindrical cross section, only always on account of non-uniform wall thickness distribution while, on the other hand, pre-formed bodies having elliptical cross section and/or different wall thickness distribution in the circumferential direction, could not be produced by injection molding in uniform quality and removed from the mold. These difficulties are overcome with the arrangement according to the invention, inasmuch as it is started with an injection-molded pre-formed body or with an intermediately blown intermediately formed body having a circular cross section, and a hollow body with a flatly oval or even an approximately rectangular cross section can be manufactured nevertheless while obtaining a uniform wall thickness distribution.

A structurally especially simple embodiment of the arrangement is characterized in that the first mold part is constructed as a guide for the second mold part.

The separating line between the mold parts, which can, for all intents and purposes, be hardly recognized on the finished hollow body, is so suitably located, in accordance with a preferred embodiment, that it extends between the first mold part and the second mold part in the region of the smallest radius of curvature of the walls of the hollow body.

An advantageous embodiment of the apparatus also comprises the shaping of the neck region of the hollow body by means of the first mould element. This first mould element can then also shape the thread usually required in the mouth region of the hollow body. In fact, the neck region of the hollow body, usually having an at least substantially circular cross-section, could also be shaped by way of the second (inner) mould element. Instead, the neck region can finally also be shaped by way of per se known neck jaws.

A particularly preferred embodiment of the apparatus for manufacturing handled bottles, in other words hollow bodies with flat cross-sections, which have a through-grip opening near the wall region at a greater distance from the middle longitudinal axis of the hollow body, is characterised by the fact that the second mould element has in its inner profile an island-like, sharp-edged elevation for creating a through-grip opening in the hollow body, which reaches into the severing plane when the blow mould halves are brought together.

In a further development of this embodiment the surface of the elevation enclosed by its edge has a concave profile to enable it to receive the region of material squeezed out during the closing movement when the mould is closed.

The drawing represents a simplified shematic diagram of embodiments of the apparatus according to the invention selected by way of example. There is shown in:

FIG. 1—a perspective, exploded view of one half of a blow mould for manufacturing handled bottles, FIGS. 2 to 5—a cross-section through a blow mold for manufacturing flat bottles in the most important operating positions and FIGS. 6 to 10—a cross-section through a blow mold for manufacturing handled bottles in the various operating positions.

FIG. 1 shows a blow mold half 1 comprising a first, outer mold element 2 and a second, inner mold element 3 having an island-like, sharp-edged elevation 4 for creating a through-grip opening in the hollow body to be manufactured. The outer mold element 2 embraces the hollow body (not shown) in the manner of a frame, in other words its shapes its outer contour along its larger cross-sectional dimension and—in the illustrated example—its neck region. At the same time the outer mold element 2 guides the inner mold element 3 in a suitable manner, the inner mold element 3 being moved up to the dot-dashed line in the outer mold element when the mold is closed. Both mold elements 2, 3 can be moved separately from one another, and yet on the same axis, by way of example on the common guide bars 5.

FIG. 2 shows the separated position of the blow mold with the forming blank F which has just been introduced, which is simply held by the blast nozzle (not shown in this illustration ) and a corresponding neck ring.

Figure 3:
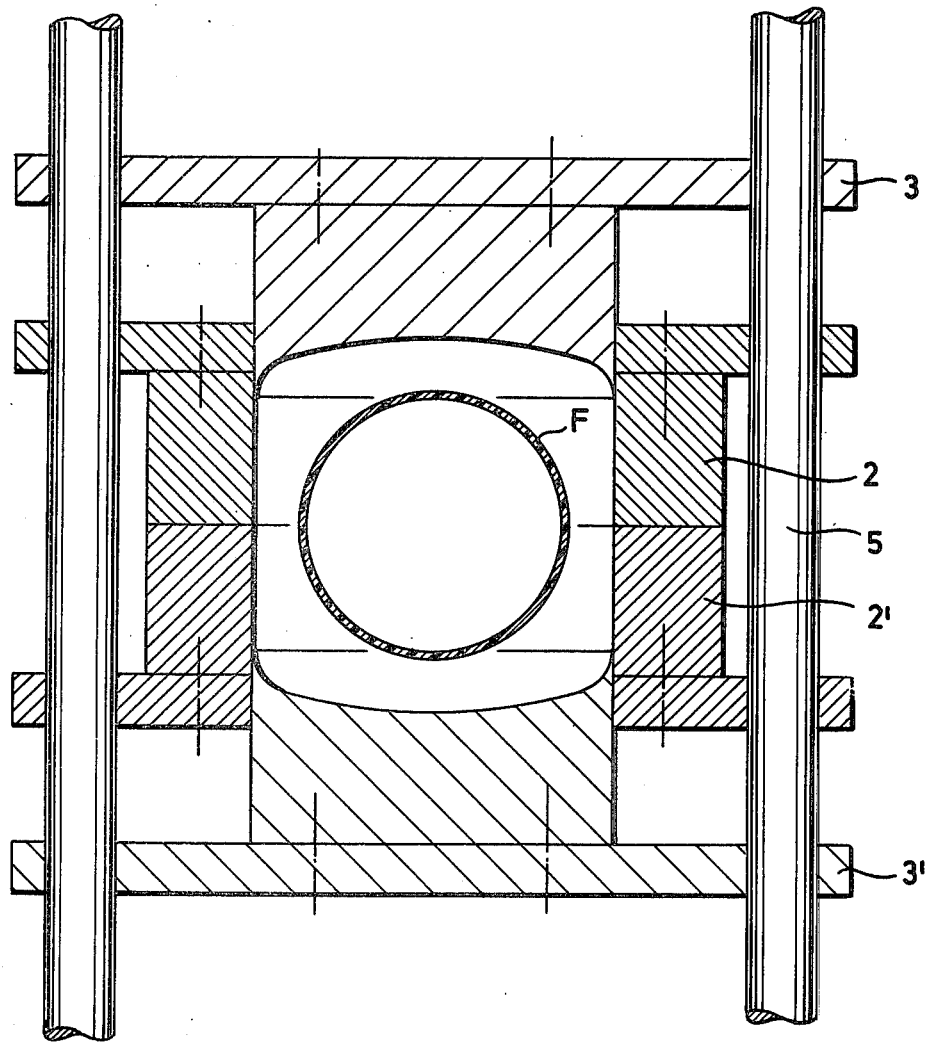

According to FIG. 3 the outer mold elements 2, 2' now move primarily into the closed position. At the same time the blowing pressure may already be somewhat increased.

Figure 4:
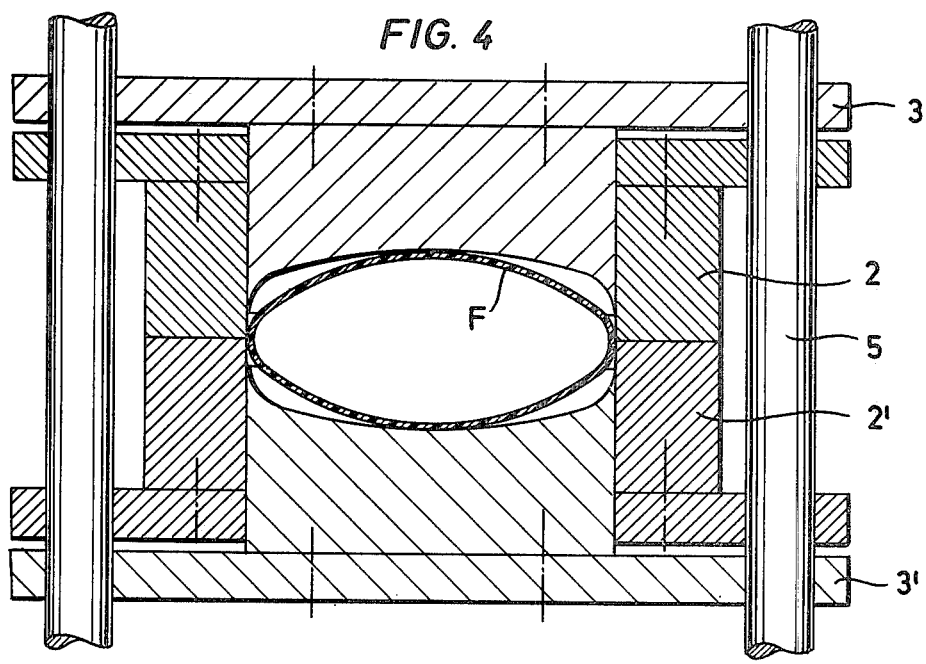

As soon as the forming blank has attained a volume still less than the volume of the finished hollow body, still without coming into contact with any of the walls of the cooled blow mold, the inner form elements 3, 3' are likewise brought together as shown in FIG. 4. During this there first occurs a point of contact between the respective inner form elements 3, 3' and the preforming blank F, during the course of the progressive compressing of the forming blank F a point of contact subsequently occurs between the forming blank F and the outer mold elements 2, 2' in the region of their severing plane. In dependence on the shape of the finished hollow body it can, however, also be expedient to instead co-ordinate the bringing together of the inner mold elements 3, 3' and the blowing of the forming blank F so that the point of contact is first made with the outer mold elements 2, 2' in the region of the severing plane.

Figure 5:
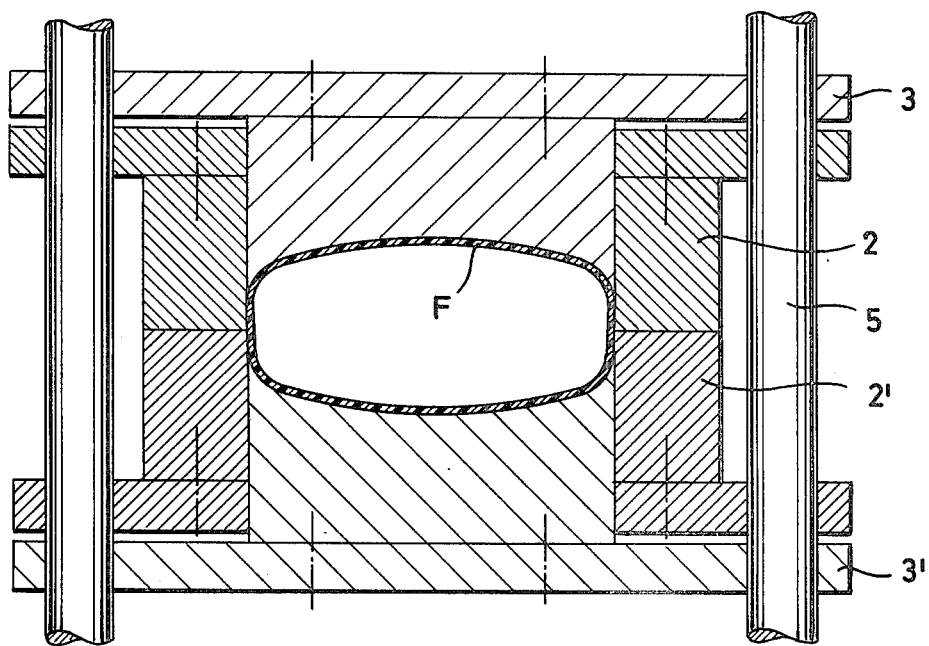

When the final position of the inner mold element 3, 3' is reached the hollow body is then blown until it is completed according to FIG. 5. After the normal cooling period the blow mold elements 2, 3 and 2', 3' are jointly separated so that the hollow body can be discharged.

This special sequence of the blowing process results in all wall regions of the forming blank F being almost evenly stretched so that not only a largely even distribution of wall thickness but also a uniform increase in resistance is produced by means of the stretching process. This in turn is synonymous with the lowest possible consumption of material to produce a hollow body with a given volume and a predetermined minimum resistance.

Figure 1:
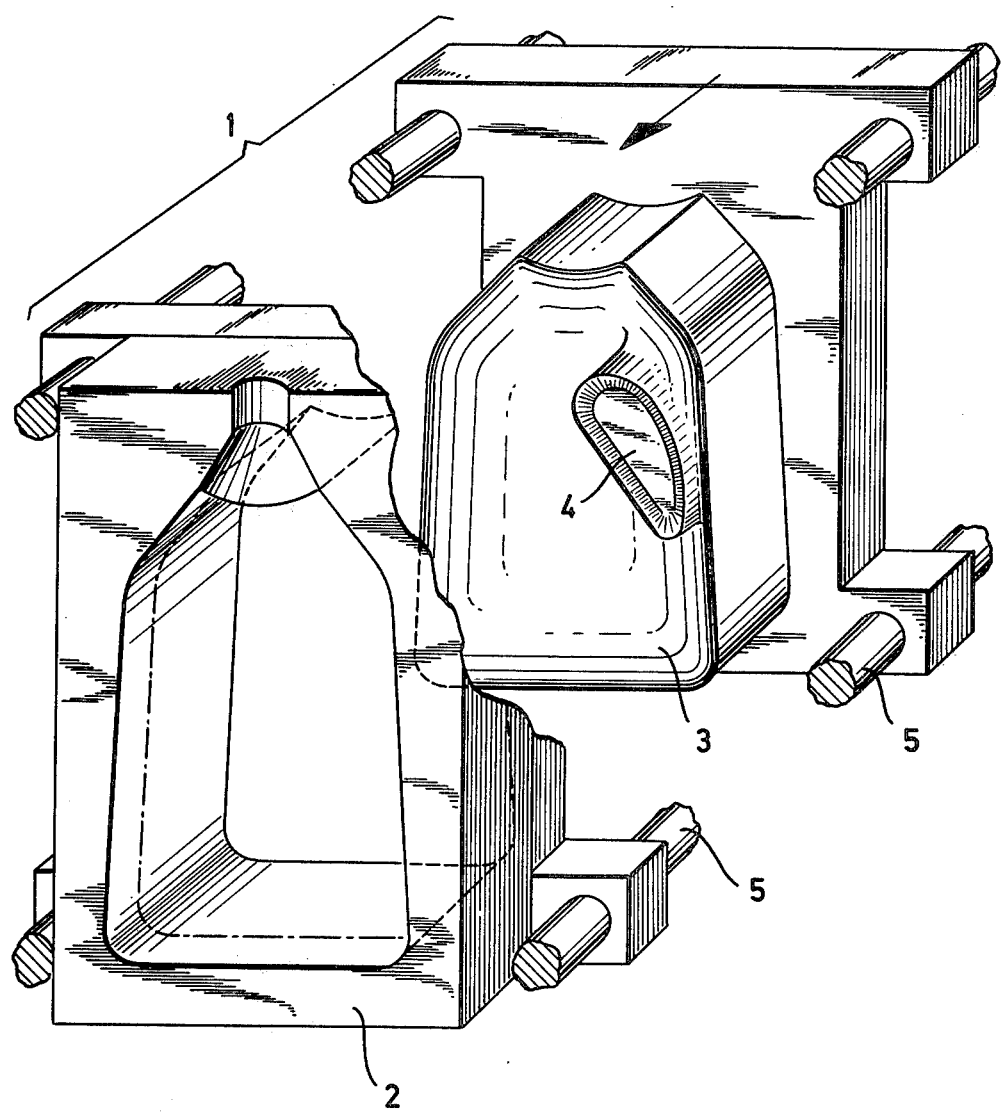
Figure 2:
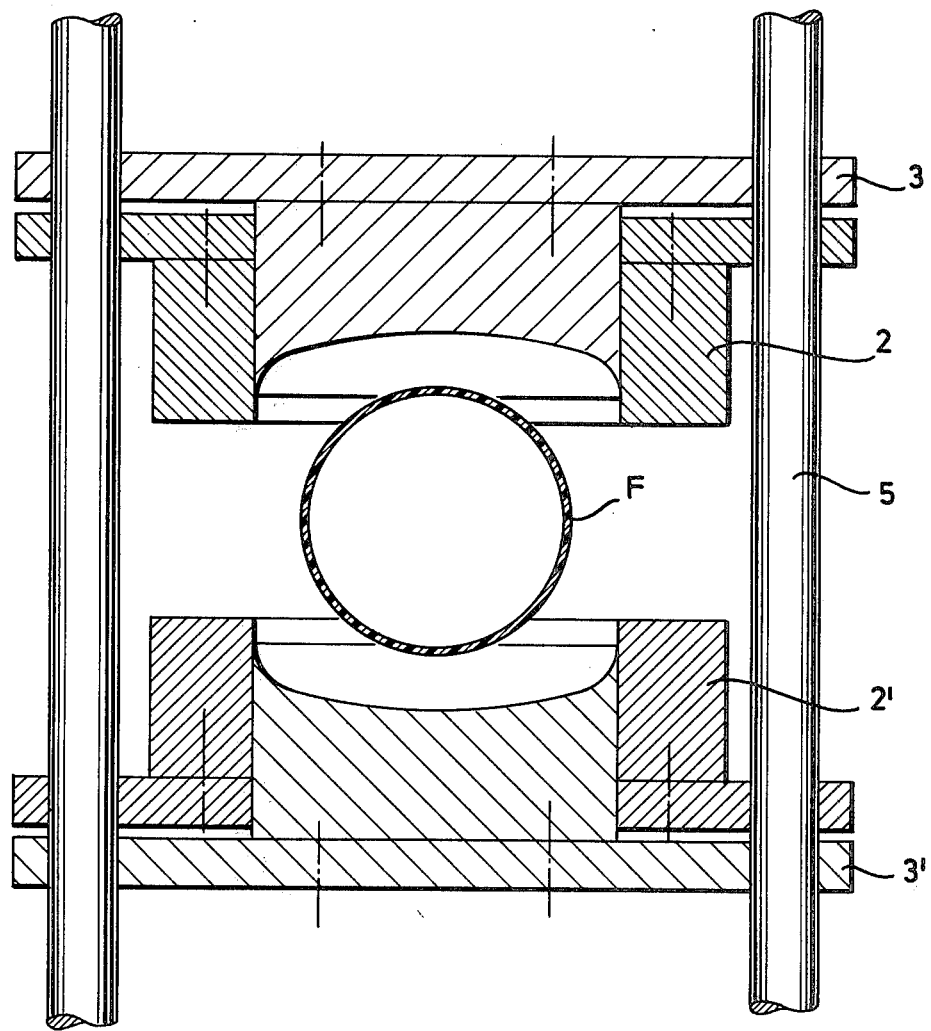
FIGS. 2 to 5 illustrate individual steps of the blowing process of a flat bottle without handle from a preforming blank, which may already be partly blown, with reference to the various positions of the blow mold drawn in cross-section.

FIGS. 6 to 10 illustrate the individual steps of the blowing of a flat bottle with handle from a preforming blank, which may also be partly blown, with the aid of the blow molds illustrated in cross-section in various positions. In contrast to the embodiment according to FIGS. 2 to 5 the inner form elements 3, 3' here each have a respective island-like sharp-edged elevation 4, 4' for producing the through-grip opening in the hollow body, this elevation reaching into the mold severing plane when the blow mold halves are brought together (cf. FIG. 1). The surface of the elevations 4, 4', enclosed by the edge, has a concave profile.

Figure 6:
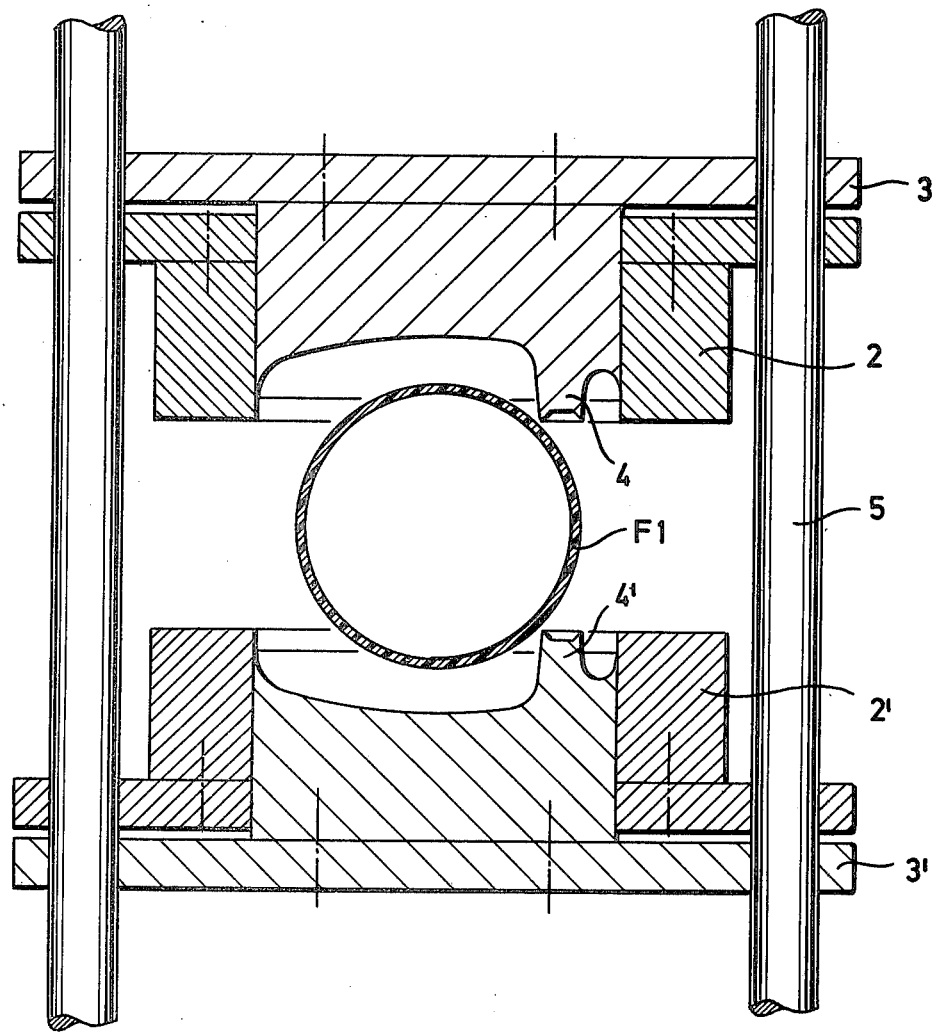
Figure 7:
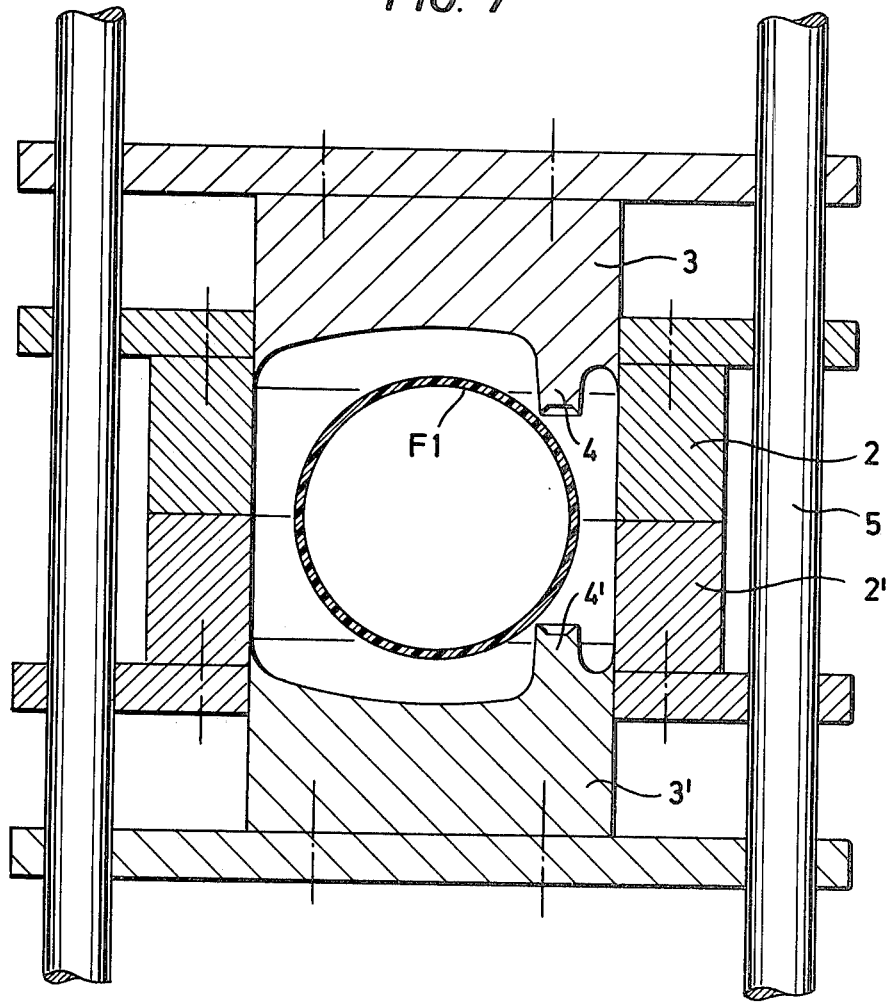
Figure 8:
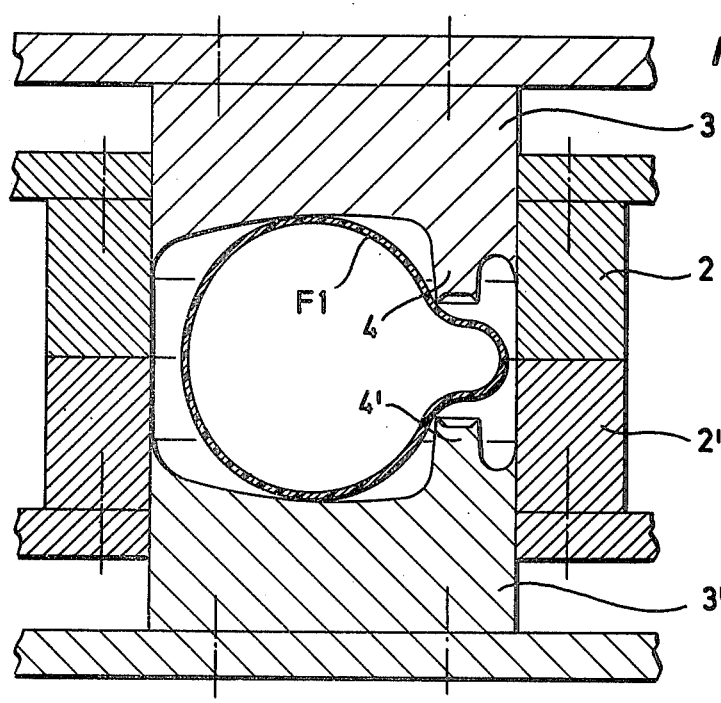

The individual steps are carried out analogously as in the embodiment according to FIGS. 2 to 5. FIG. 6 shows the original position. In FIG. 7 the mold elements 2, 2' are brought together. FIG. 8 shows the beginning of the movement towards each other of the inner mold elements 3, 3'. The island-like elevations 4, 4' begin to compress the forming blank F1, which simultaneously rests against the large surface of the inner mold elements 3, 3'.

Figure 9:
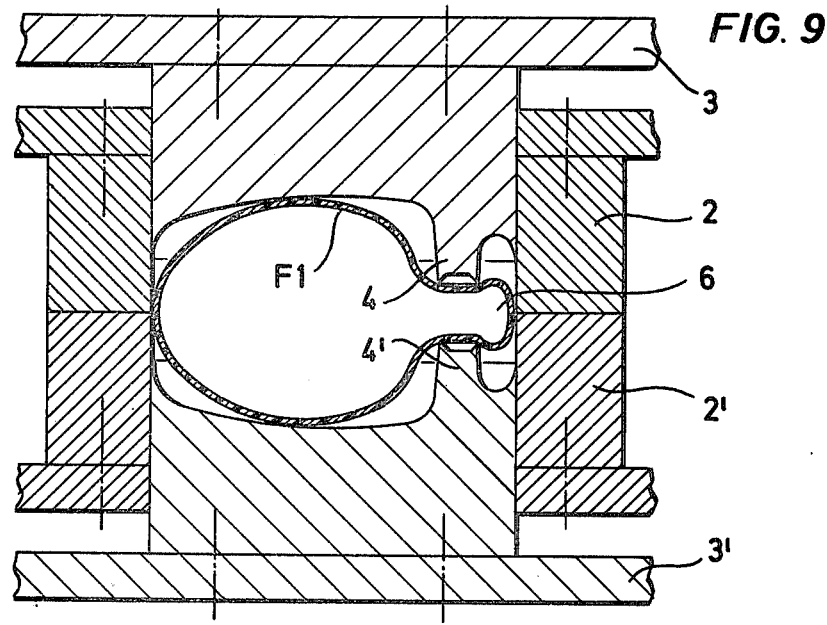

In the position of the inner mold elements 3, 3' according to FIG. 9 the handle region 6 of the latter hollow body is beginning to be shaped.

Figure 10:
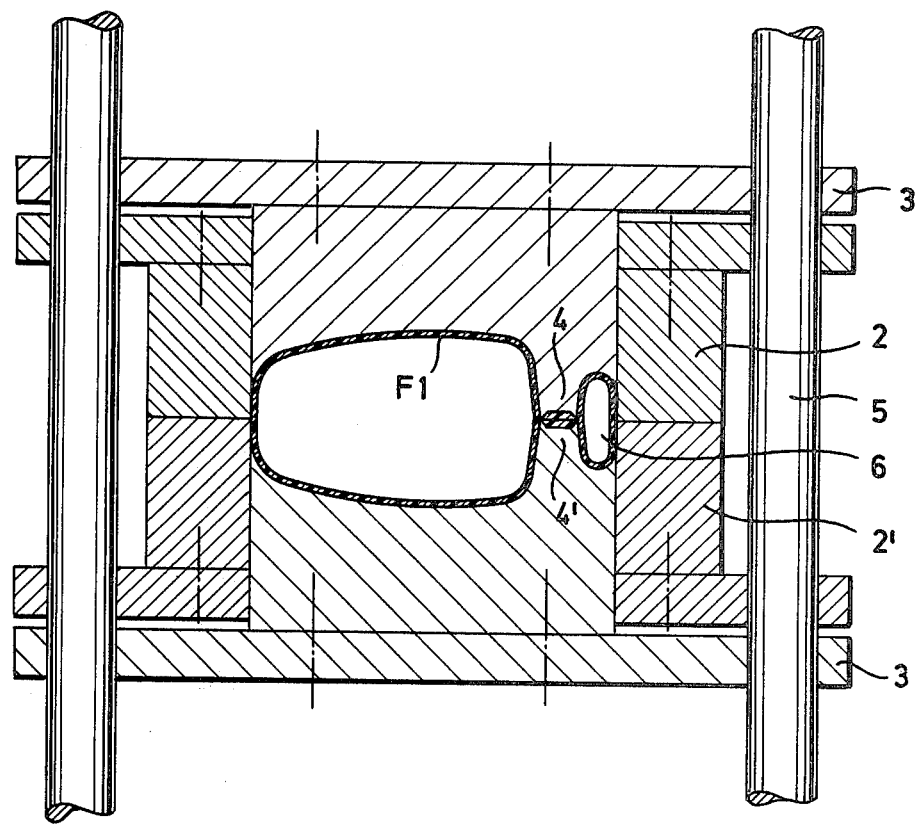

In the position according to FIG. 10 the inner mold elements 3, 3' have been brought together completely and the hollow body has been completely blown, whereby the elevations 4, 4' have squeezed together the material in the region of the through-grip opening and have taken it up in the space limited by the concave surfaces set back opposite the edge. After the cooling and discharging of the hollow body this squeezed-together material falls out of the through-grip opening almost by its own means or is pushed out by means of a suitable device.

I claim:

1. A blow mold for producing bottles or similar hollow containers from parisons of synthetic plastic material, comprising two mirror-symmetrically arranged blow mold halves movable toward and away from each other normal to a separating plane of the mold between a closed and an open position, each of the mold halves comprises an outer mold part having an inner endless face defining in the closed position of the mold halves part of a mold cavity for forming a bottle and an end face located in the closed position of the mold halves in said separating plane and abutting against a corresponding end face of the outer mold part of the other mold half; and an inner mold part having an outer endless face guided for independent movement relative to the respective outer mold part in said inner endless face of said outer mold part, and a concavely curved end face extending transverse to said inner endless face thereof and having an end edge spaced in the closed position of the mold halves from said separating plane.

2. A blow mold as defined in claim 1, wherein said end face of each outer mold part is also provided with a cavity for forming half of the neck of the bottle.

3. A blow mold as defined in claim 1, wherein said end face of each inner mold part is provided with an island-shaped sharp edged projection aligned with and engaging the sharp edged projection on the other inner mold part in the closed position of said mold halves.

4. A blow mold as defined in claim 3, wherein the surface of said projection enclosed by its edge has a concave configuration.

* * * * *